United States Patent [19]

Jenkins

[11] 4,135,039
[45] Jan. 16, 1979

[54] ELECTRODE STRUCTURES AND ELECTRODES THEREFROM FOR USE IN ELECTROLYTIC CELLS OR BATTERIES

[75] Inventor: Jonathan M. Jenkins, Sevenoaks, England

[73] Assignee: Unigate, Limited, London, England

[21] Appl. No.: 804,215

[22] Filed: Jun. 7, 1977

Related U.S. Application Data

[63] Continuation of Ser. No. 244,795, Apr. 17, 1972, abandoned, which is a continuation of Ser. No. 12,279, Feb. 18, 1970, abandoned.

[30] Foreign Application Priority Data

Feb. 21, 1969 [GB] United Kingdom ................. 9548/69

[51] Int. Cl.² ........................ H01M 4/64; H01M 4/96
[52] U.S. Cl. ..................................................... 429/27
[58] Field of Search ........................................... 429/27

[56] References Cited

U.S. PATENT DOCUMENTS

| | | | |
|---|---|---|---|
| 2,924,634 | 2/1960 | Fischbach et al. ..................... | 429/27 |
| 3,306,779 | 2/1967 | Flannery .................. | 429/42 |
| 3,421,994 | 1/1969 | LeDuc ................... | 429/29 |
| 3,518,123 | 6/1970 | Katsoulis et al. ...................... | 429/28 |
| 3,586,540 | 6/1971 | Petraits et al. ......................... | 429/29 |
| 3,607,421 | 9/1971 | Werth ..................................... | 429/16 |
| 3,623,911 | 11/1971 | Oswin ..................................... | 429/29 |
| 3,719,526 | 3/1973 | Zito ....................................... | 429/199 |

Primary Examiner—John H. Mack
Assistant Examiner—H. A. Feeley
Attorney, Agent, or Firm—Sughrue, Rothwell, Mion, Zinn and Macpeak

[57] ABSTRACT

A rechargeable zinc halogen cell is disclosed, together with a carbon electrode structure, an electrode including at least two of the electrode structures, and a metal electrode, all of which may be used with the zinc halogen cell.

The electrode structure has a substrate of anodizable metal of Groups IV(A) and V(A) of the Periodic Table, and this substrate has a permanent coating of porous carbon. At least two of these structures are used to make up a halogen storage electrode.

The metal electrode comprises a substrate of anodizable metal of Groups IV(A) and V(A) of the Periodic Table of open mesh coated with zinc or a zinc-containing alloy or salt. The rechargeable zinc-halogen cell utilizes halogens of chlorine, iodine or bromine and may use the electrodes described above.

28 Claims, 10 Drawing Figures

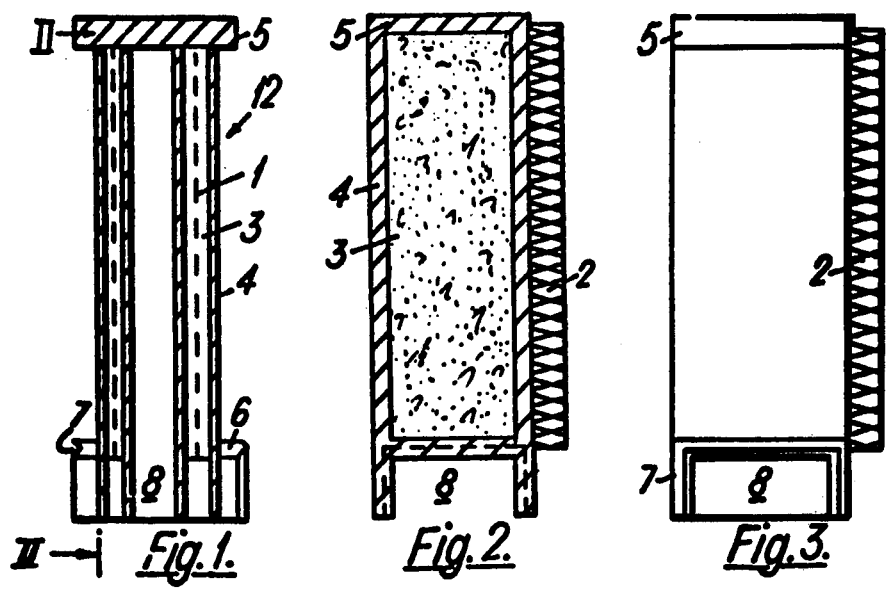
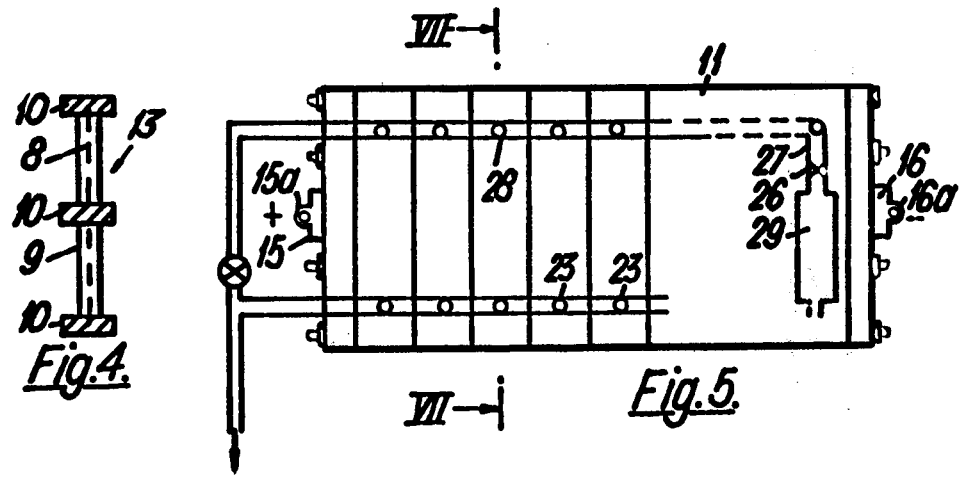

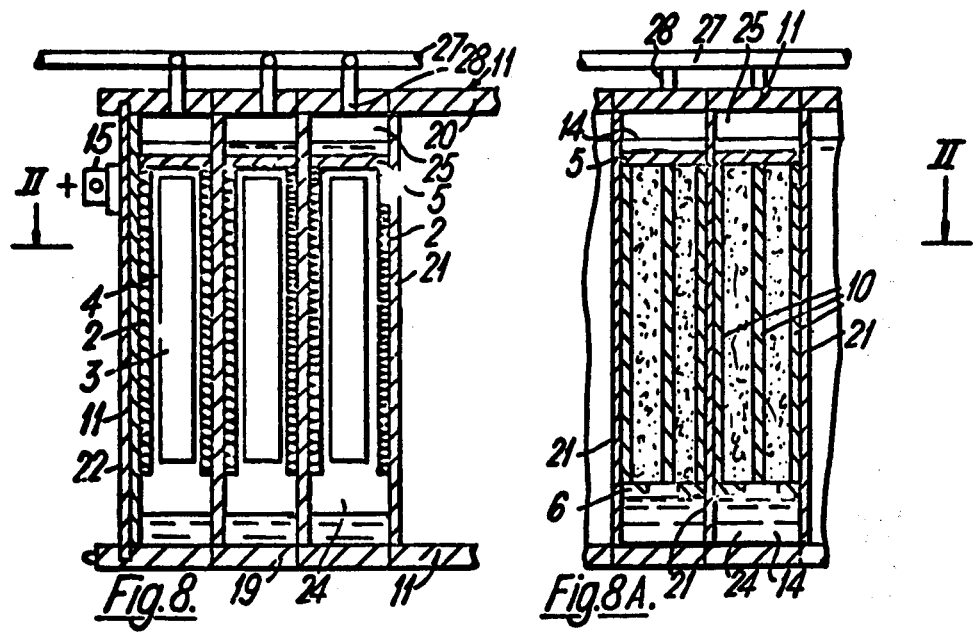
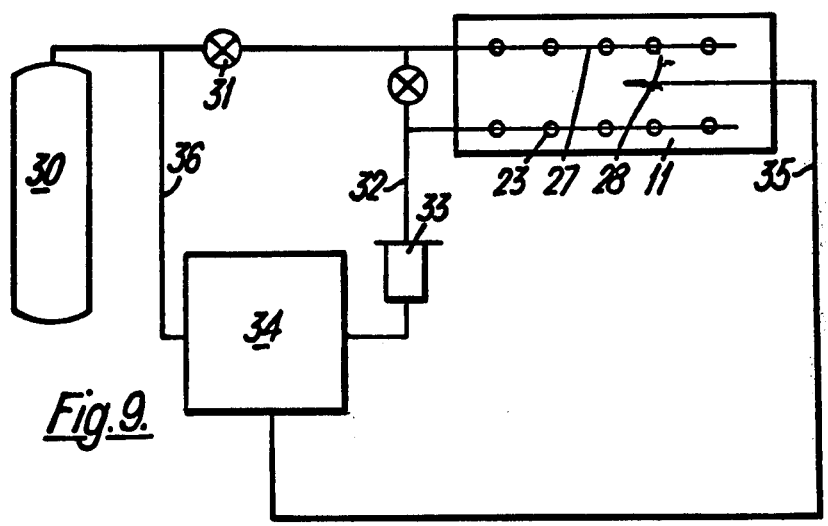

ELECTRODE STRUCTURES AND ELECTRODES THEREFROM FOR USE IN ELECTROLYTIC CELLS OR BATTERIES

This is a continuation of application Ser. No. 244,795, filed Apr. 17, 1972, which is a continuation of U.S. application No. 12,279, filed Feb. 18, 1970, both now abandoned.

BACKGROUND OF THE INVENTION

1. Field of the Invention

This invention relates to electrodes for use in rechargeable electric zinc halogen cells and batteries composed thereof in brine electrolysis, sewage and sea water treatment and like synthetic uses.

2. Description of the Prior Art

Primary zinc halogen cells using carbon electrodes are known where either the halogen is stored in the carbon electrodes, or external of the electrodes in a separate container from whence it is injected into the carbon electrodes but in either case it has not been possible to construct a practical battery that is rechargeable since collection and readsorption of the halogen during charging has been prevented by the types of electrodes hitherto available. In addition such primary batteries hitherto available have suffered either from high rates of self discharge or other limitations electrical and mechanical which have severely limited their use.

The main object of the present invention is to produce an electrode structure and an electrode incorporating an electrode structure inter alia for use in a zinc halogen cell or battery which can be repeatedly charged and discharged and in which the said disadvantages are minimised or substantially eliminated.

SUMMARY

The invention provides an electrode structure comprising a substrate of anodizable metal selected from the metals of Group IV(A) and Group V(A) of the Periodic Table according to Mendeleef having permanently associated therewith at least one coherent stratum of substantially porous carbon.

The anodizable metal may be titanium, tantalum, zirconium or alloys of any two of or all of such metals, of which titanium is preferred. The stratum is preferably in the form of an open mesh such as expanded metal, an apertured sheet of the metal, or a porous sheet of the metal having a pore size for example of 3-25 thousandths of an inch in diameter. When titanium is used it is preferably of commerical purity for example having a mehcanical hardness of I.M.I CP 130.

Alternatively the titanium may have a semi-conducting coating applied for instance as a nitride film obtained by heating the titanium in nitrogen as by passing an electric current through the metal or by immersing the metal in a molten cyanide bath, or the nitride may be applied by hot pressure sintering titanium nitride powder. In similar manner coatings of mixed oxide, nitride and boride may be applied to the metal and have been found to give good electric conductivity as well as being resistant to chlorine attack. By alloying or doping titanium with an element giving a higher valency oxide such as tantalum, defect structure oxides can be formed which are semi-conducting and can function as electrodes in oxidising conditions. Such alloys are self-regenerating if damaged. A suitable titanium alloy contains 0 to 5% tantalum. Electrodes formed of purely conductive titanium compounds such as nitride may be used, formed in any suitable manner as by sintering.

The carbon stratum may be permanently associated with the anodizable metal by any suitable means. For example the carbon in particulate or granule form, tumble bonded with a powder of synthetic resin, may be adhered as by hot pressing to the metal. Alternatively the carbon powder may be adhered to the anodised metal by cold pressing.

Suitable resin materials include polyethylene, polyvinyl chloride, polytetrafluoroethylene, polychloroprene, polypropylene, nylon or nitrile rubber. If polychloroprene is used the preferred particle size is between 50m$\mu$ and 190m$\mu$.

Alternatively the carbon powder may be bonded with resin such as polyethylene dissolved in a solvent such as carbon tetrachloride, using an inert filler such as solid particulate zinc halide, e.g. chloride for a zinc chlorine cell, which can be subsequently leached to provide porosity in the carbon stratum.

Preferably the synthetic resin constitutes 5% to 25% by weight of the bonded mixture.

According to another aspect of the invention a method of making an electrode structure comprises bonding a porous stratum of a mixture of carbon under pressure. The metal substrate may be etched before the application of the mixture.

The invention also comprehends an electrode structure made by this method.

From another aspect of the invention a halogen storage electrode for use in a rechargeable zinc halogen electric cell or battery, comprises at least two spaced electrode structures of the invention, preferably in plate or like form, joined together along one, two or three edges, and a covering of synthetic resin material inert to the halogen secured in a gas-tight manner round the edges leaving the surface carbon stratum free and leaving one end of the electrode open to permit gas access to the enclosed space between the electrode structures, provision being made for an electrical connection to the metal substrate.

The resin covering is preferably of polyethylene, high density polyethylene being preferred for a rigid covering, polypropylene, polytetrafluoroethylene or nylon. The covering leaves the carbon stratum free on the outer face of the electrode and within the hollow interior of the electrode between the electrode structures. The open end of the joined electrode structures communicates with an open channel extending across the electrode for directing gas into the space or spaces between the electrode structures. The metal substrate preferably has a portion which projects through the resin surround for connection, as by welding, to a plate, e.g. of titanium, forming part of a cell or battery construction as hereinafter described.

The invention also relates to an electrode for use in an electrolytic cell or battery comprising a substrate of anodizable metal of Group IV(A) or Group V(A) of the Periodic Table of open mesh, apertured, expanded metal or porous metal form, coated with zinc or an alloy zinc, mercury indium and/or gallium.

Preferably the anodizable metal is titanium, but it may be tantalum, zirconium or alloys of two or more or all of such metals. Preferably spacer elements of material inert in the cell are provided to separate the electrode from adjacent electrodes when assembled in a cell or battery. The spacer elements may be of any suitable material, such as synthetic resin plastic, e.g. polyethylene or polytetrafluoroethylene.

This zinc electrode may be made in any suitable manner as by forming a substrate of porous anodizable metal of Group IV(A) or Group V(A) of the Periodic Table, and coating the substrate with zinc or zinc containing a powder which is later removed or zinc alloy to form particularly in these latter cases, a porous zinc containing layer thereon. The volume of voids of this porous zinc structure is preferably about 50% of the total structure volume. The zinc powder may be applied to the metal substrate mixed with ammonium chloride and sintered under a pressure of between 5 and 50 lbs. p.s.i., the amount of ammonium chloride being adjusted to give a desired porosity to the electrode. Alternatively the zinc powder may be mixed with a synthetic resin powder, for example a resin selected from the group containing polyethylene, polyvinyl chloride, polytetrafluoroethylene, polypropylene, nylon or rubber nitrile, and the mixture is applied to the metal substrate and treated as by curing to adhere thereto.

The zinc may however be applied to the metal substrate by electroplating, or by spraying it with molten zinc or by dipping the substrate into molten zinc covered with a layer of melted zinc chloride.

The anodizable metal may be in the form of plates or sheets, or expanded metal, apertured sheets or plates, or the metal may be porous as in sintered form. The porisity of the electrode is preferably of the order of 50% by volume.

According to another aspect the invention comprises a rechargeable zinc halogen cell, or a battery made of such cells, the halogen being chlorine, iodine or bromine or any combination of two or all said halogens. In the cases where bromine and/or iodine are used, the cell has to run at such temperature as to endure the bromine and/or iodine is gaseous at their partial pressures.

Chlorine, bromine or iodine may be used in solution, e.g. in carbon tetrachloride. Bromine and iodine may also be used as a mixture in solution as in C. CI$_4$.

Preferably the cell comprises a casing, a porous halogen storing electrode and a zinc bearing electrode mounted in the casing and separated by liquid zinc halogen solution as electrolyte, a halogen gas inlet to the casing, a gas flow path in the casing from the gas inlet to the interstices of the halogen storing electrode, a closure to the casing above the level of the electrolyte to receive excess halogen gas, and positive and negative electric conductors leading from the end electrodes to terminals accessible to the outside of the casing. The cell or each cell may have a halogen storage electrode formed of a number of electrode structures as aforesaid. The zinc electrode is also preferably formed as aforesaid.

The cell or battery may comprise the casing, titanium end walls in the casing, titanium walls separating electrode compartments in the casing, a number of chlorine storage carbon metal electrodes (as herein defined) mounted between two consecutive titanium walls interspaced with zinc bearing electrodes (as herein defined), and a halogen gas inlet to preferably the upper part of the casing and communicating with the open bottom portions of the carbon-metal electrodes which form a common channel for the gas in the cell, the carbon-metal electrodes and the zinc bearing electrodes being electrically connected respectively to positive and negative poles of the cell or battery. Preferably the gas inlet may open into the hollow interior of one or more, e.g. the end one or ones, of the metal carbon electrode or electrodes. The electrolyte in the casing covers the outsides of the carbon-metal electrodes and the zinc electrodes and the gas channel is open downwards to the electrolyte which is prevented by the halogen gas pressure from filling the channel or rising into the hollow interior of the carbon-metal electrodes.

A gas space, for expansion of the halogen gas, is provided above the electrodes and electrolyte in the casing, which accommodates the electrolyte level changes and collects the halogen gas displaced from the hollow electrodes when the cell or battery is being charged.

The electrolyte is preferably zinc chloride and the halogen gas chlorine; preferably the electrolyte has a pH value of between 2.5 to 4.0 and a specific gravity of 1.1 to 1.25.

The electrolyte may be purified by dissolving it in deionised water containing zinc dust so as to precipitate impurities, or it may be purified by pre-electrodising at a controlled voltage.

Preferably, to assist in the reduction of the formation of dendrites, the electrolyte contains small quantities of mercury, indium, or gallium.

In another preferred embodiment the electrolyte contains poly electrodes in quantities of less than 0.5% by weight of the electrolyte.

Alternatively the electrolyte may contain thiourea in quantities of about 1% by volume of the electrolyte.

Potassium chloride to saturation may be added advantageously to the electrolyte.

The battery or cell is in a halogen gas circuit including a halogen gas cylinder, a pressure regulator valve, an ultra violet lamp for the removal of undesirable gases such as hydrogen from the circuit, and a halogen gas liquefier, the liquefier being connected to the cylinder and the lamp being in the circuit between the valve and the liquefier. An aqueous return may be provided from the liquefier to the cell to return water, which normally has other constituents, into the cell or battery electrolyte.

The gas liquefier may be of any suitable construction which may include a compressor. One form of liquefier comprises a closed container filled with oil, such as gun buffer oil, in which is immersed a concertina like bellows or other flexible envelope or suitable material such as polyvinyl chloride, polyethylene or nylon, the envelope having a halogen gas inlet and a liquid halogen outlet with suitable non-rturn valves, e.g. ball or flap valves, means operable from outside the container being provided to compress the envelope via the hydraulic fluid and to allow it to expand by a spring to exert a positive evacuation pressure on the gas in the battery. The oil for example may be pumped into the container to compress the envelope and then sucked out or allowed to flow out under the pressure of the gas expanding in the compressed envelope.

In the cell or battery of cells of the invention the halogen gas acts as one electrode, the zinc being the other electrode. The carbon-metal construction of the electrode provides the halogen gas store in its hollow interior and its pores: it is important that the halogen gas can come into contact with the maximum surface area of the carbon and that the halogen can migrate through the carbon into the electrolyte, and the ions vice versa during charging and discharging of the cell or battery.

BRIEF DESCRIPTION OF THE DRAWINGS

FIG. 1 is a diagrammatic cross section through a carbon-metal electrode for use in the cell or battery of FIGS. 5 to 8A and made up of two interconnected electrode structures, FIG. 2 is a cross section of the electrode along the line II—II of FIG. 1 looking in the direction of the arrows, FIG. 3 is a view of the electrode looking from the left of FIG. 1, FIG. 4 is a diagrammatic cross section of a zinc electrode for use in the cell or battery, FIG. 5 is a diagrammatic plan view of a rechargeable zinc halogen battery, FIG. 8 is a cross section through part of the battery along the line VIII—VIII of FIG. 7 looking in the direction of the arrows, and showing the carbon-metal electrodes, FIG. 8A is a similar view to FIG. 8 on the line VIII—VIIIA of FIG. 7 showing the zinc electrodes, and FIG. 9 is a line diagram of the battery including the halogen gas circuit thereof.

DESCRIPTION OF THE PREFERRED EMBODIMENT

Figure 6:
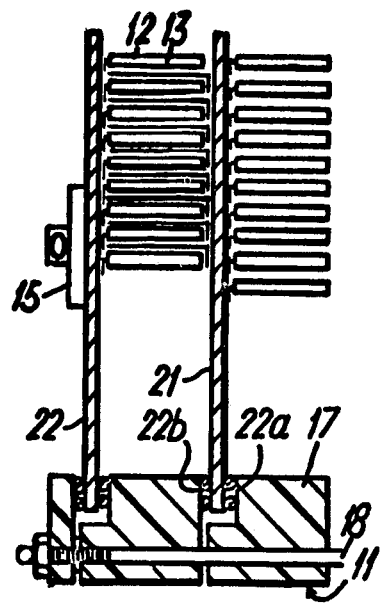
FIG. 6 is a partial horizontal cross section through the battery of FIG. 1 on the line II—II of FIGS. 7, 8, 8A looking in the direction of the arrows.

Referring to the drawings, the references therein used designate the same parts. The construction of the drawings is described as a zinc chlorine battery, but the halogen may be iodine or bromine, with modification to the mechanical design.

Referring to FIGS. 1 to 3 each electrode structure comprises a titanium substrate 1 or it may be another anodizable metal of the Groups IV(A) or V(A) of the Periodic Table according to Mendeleef such as tantalum or zirconium or alloys of any or all of these metals. The substrate is of open mesh such as expanded metal or a wire mesh of the metals and has a portion 2 which extends outside the electric structure forming an electrical connection in a cell. Bonded to the substrate is a mass of carbon 3 of such a porous nature that in use in the battery as will be described the chlorine ions can migrate therethrough in the electrolytic process. The carbon is possibly in the form of lamp black or carbon granules preferably bonded together to form a carbon mass with a synthetic resin such as polyvinyl chloride, a synthetic rubber nitrile or polychloroprene. The actual mixture of resin with the carbon may be effected by tumble bonding using for example a heated drum or granulator. Small slices of carbon or graphite may be impregnated with a latex or solution of resin to act as an impervious barrier between the cells and small slices of carbon are then bonded into a large sheet as by injection moulding to give a flexible carbon electrode. Application of an active surface to the carbon surface by coating may be effected with an activated carbon powder such as acetylene black bonded with a solution of resin such as polyethylene in carbon tetrachloride or ethylene trichloride. Catalysts such as platinum may be applied to the carbon by impregnation and subsequent firing or by electro deposition. Where the carbon powder is bonded with polyethylene dissolved in carbon tetrachloride an inert filler may be incorporated such as zinc chloride which is subsequently leached out to give a more porous electrode. The carbon powder may be activated by heating to about 400° C. in an inert gas such as argon or carbon dioxide or it may be in chlorine itself.

The optimum particle size of the carbon, for a satisfactory electrical performance of the cell, depends on providing the highest surface area but the particles must be coherent either naturally as in acetylene black for example or made coherent by the application of the resin. When the resin powder used is polychloroprene, this preferably has a particle size of between 50 m$\mu$ and 190 m$\mu$. Quartanary ammonium compounds may also be used as a surfactant to obtain optimum contact angles of the electrolyte with the carbons in a cell. Silica gell may be added to the carbon to improve the chlorine storage and the effect of the carbon and silica gell is synergistic from a performance standpoint and this incorporation of the gell may be effected by impregnation of the complete electrode to minimise the conductivity drop otherwise likely to be encountered in the electrode if the silica is premixed with the carbon used in the cell.

The carbon mixture may be bonded to the metal substrate by hot pressing or cold pressing; pressures of between 2 tons psi and 5 tons psi may be employed at temperatures between 15° C. and 140° C.

In place of the titanium in the electrode structure, alloys of titanium or tantalum of zirconium or those metals themselves may be employed.

The current collector 2 makes contact through the carbon and reaches to the outside of the electrode. Another example of applying the carbon to the titanium is to enclose the titanium mesh in a bag filled with carbon granules.

More specifically the carbon and resin may be bonded together and compounded using acetylene black which is wetted with about ten times by weight of water at 50° C. to which a drop or two of acetone may be added. 50% nitrile resin latex material is diluted about ten times with cold water and added slowly while stirring to the carbon; the stirring should be vigorous and thorough but care must be taken not to beat the mixture and to cease the stirring as soon as all the resin has been absorbed and a crumb has formed. Best results have been obtained when the resin comprises from 5% to 25% by weight of the bonded mixture. The correct particle size of the latex should be selected which will produce the optimum conductivity to strength values for the three dimensional mesh of resin in which the carbon is held. The nitrile resin hardens on chlorination thus setting the electrode structure in situ.

The resultant electrode structure is preferably between 38% and 50% porous.

To improve the adhesion of carbon to the metal substrate, the latter may be treated by etching in a 4% solution of ammonium bifluoride and subsequently kept covered with water or by dilute hydrochloric acid until the carbon is pressed on to the substrate; alternatively the substrate of metal can be plated with platinum by any known method or the substrate can be nitrided.

The electrode structure consisting of the substrate 1 and the carbon 3 is shown in FIGS. 1 to 3 as covered with a synthetic resin material 4 such as high density polyethylene, polypropylene or nylon and this cover which is of sheet form may be applied in any known manner leaves the surfaces of the carbon 3 free.

The electrode as shown in FIGS. 1 to 3 is formed of two electrode structures as already described which are joined together at the top by a member 5 of plastic or other suitable material and is encased in or is formed as part of the coating. At the bottom of the two electrode structures on the outside are male and female spacing members 6, 7 for the purpose to be described. Below the spacing members the electrode structures are extended to form a channel 8 for a chlorine gas channel in the cell or battery.

The metal electrode shown in FIG. 4 consists of a metal mesh 8 similar to the mesh used in the electrode of FIGS. 1 to 3 and this mesh is covered with a coating 9 of zinc, spacer elements 10 of suitable inert plastic material preferably microporous e.g. polyvinyl chloride being provided to ensure that the metal electrode is spaced from the electrode structures in the assembled cell or battery. A suitable plastic for the spacer elements 10 is polyethylene or polytetrafluoroethylene.

In making the metal electrode of FIG. 4 zinc powder may be sintered with ammonium chloride at 250° C. on the titanium mesh substrate 8 under pressure, the amount of ammonium chloride being varied to give the desired porosity of about 50% per volume. The titanium substrate assists in reducing the zinc migration and the extended surface electrodes give higher peak currents. The zinc powder may be bonded to the mesh by mixing with a resin as is employed with the carbon in the electrode structures of the carbon titanium electrodes.

To eliminate hydrogen embrittlement the titanium may be protected by zinc plating or by noble metal plating; the zinc may be plated on either by electroplating or by spraying or by dipping the mesh into the molten zinc covered with a layer of melted zinc chloride. The zinc may be mangled on to the titanium mesh under pressure in the normal way if desired or it can be pressed on to the mesh in any other suitable manner.

Referring to FIGS. 5 to 8A, the cell or battery comprises in pile-form side by side in a casing 11 alternate carbon-metal electrodes 12 of FIGS. 1 to 3 and zinc electrodes 13 of FIG. 4, all immersed in an electrolyte 14, the electrodes 12 all being electrically connected to an external terminal 15 and the electrodes 13 all being electrically connected to an external terminal 16 as will be described.

Figure 7:
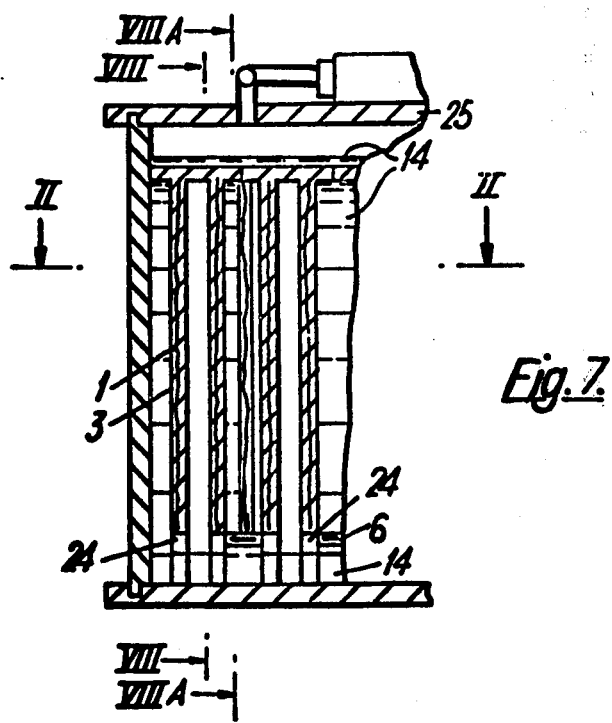
FIG. 7 is a cross section through part of the battery on the line VII—VII of FIG. 5.

More specifically within the casing 11 are mounted a plurality of cells some of which are seen in cross section in FIGS. 7, 8 and 8A; the cells extend across the battery and are tall and thin as seen in FIGS. 7, 8, 8A and are arranged juxtaposed side by side to form one complete cell, the cells being built up side by side to form a battery, the casing being formed as cell wall sections 17 bound together in fluid-tight contact by the rods 18; the sections are set on a base 19 and covered by a top 20 all in a fluid tight manner. The cells are separated by plates 21 of electrically conducting inert material, e.g. titanium or titanium alloy, and along the cell casing sides at right angles to the electrodes are similar plates 22 one of which is shown.

Each cell is made up of alternate electrodes 12, 13, each of which is connected electrically by its portion 2 to the plates 21, 22. The electrodes 12 at their lower ends are held together by the male and female spacing members 6, 7 which can be snapped together to unite the carbon-metal electrodes in a tight structure over the length of the cells and the tops 5 of the electrodes 12 are held in contact by the rods 18. The electrodes 13 are disposed to extend upwardly in the cell between the electrodes 12 from which they are kept separated by the separators 10. The plates 21, 22 are sealed by grommets 22a in recesses 22b in the sections 17.

The terminals 15, 16 are preferably plates about 3 inches square with the current collectors 15a, 16a covering a large area such as U- or X- shaped.

Within the casing is the electrolyte 14 to be described in which all the electrodes are immersed and a halogen gas inlet 23 is provided at one end or side of the cell communicating by a passage (not shown) preferably through the hollow space in one of the electrodes 12 with a gas channel 24 (formed by the portions 8 of the electrodes 12) at the bottom of the casing in the electrolyte which extends beneath all the electrodes; the channel 24 is closed at the cell ends by the plastic cover 4 of the end electrodes and communicates with the hollow interiors of all the electrodes 12 for the purpose to be described, the electrolyte 14 extending into the channel 24 to form a gas seal thereto but permitting gas to bubble out of it into the electrolyte if the gas pressure rises too high inside the electrodes 12.

The electrolyte level is arranged to be below the lid 19 of the casing leaving a space 25 above the electrolyte for expansion purposes.

The casing top 20 has a pressure release valve 26 communicating through pipe 27 and vents 28 with the space 25 above the electrolyte and beneath the lid 20 so that should the gas pressure within the battery exceed a predetermined amount it will escape through the release valve and pass through a halogen absorbent chamber 29 to exhaust. This ensures that no noxious or poisonous halogen e.g. chlorine gases escape into the atmosphere; in the event of the escape of gases through the valve 26 these will be replaced in the cell from the halogen cylinder 30 to be described.

Referring to FIG. 9 the cell or battery chlorine circuit has the chlorine cylinder 30 connected through a pressure regulator valve 31 to the gas inlets 28 of the battery. Gas outlets 23 at the top of the battery are connected to a line 32 leading back to the cylinder 30 through an ultra violet lamp 33 to be described and a halogen liquefier 34. The ultra violet lamp in known manner is in close proximity to the pipe line 32 and operates to remove hydrogen which may appear in the halogen gas and convert it to hydrochloric acid which is returned through the pipe line 35 to the battery i.e. into the electrolyte, together with condensed water vapour and liquid carry over.

While the battery can operate with any halogen as herein explained, chlorine is preferred as the most easily controlled: the description of the cell or battery of the drawings is for use with chlorine only, suitable adjustments as herein mentioned being necessary to make it applicable to bromine and/or iodine.

The electrolyte in the battery is zinc chloride in aqueous form and some mercury, indium or gallium may be added to the electrolyte to assist in the reduction in the formation of dendrites. If the amount of mercury is more than 2% by weight of the zinc and the temperature of the electrolyte during charging of the battery as will be described is over 43° C. there will always be some liquid phase present and this will minimise the formation of dendrites. The temperature can however be lowered by addition of small quantities of tin, indium or gallium. These additions also increase the hydrogen over potentials.

Poly electrolytes such as polyvinyl-alcohol may be used to reduce the formation of the dendrites, such polyelectrolytes used in small quantities of less than 0.5% by weight of the electrolyte. Thiourea at about 1% by volume of the electrolyte also assists in suppressing the dendrites.

The purity of the electrolyte is important in dendrite minimisation and the electrolyte may be purified by dissolving zinc chloride in deionised water with zinc dust stirred in and left for a few hours to precipitate impurities. The presence of some zinc oxide assists in removing iron which has been shown to increase the formation of the dendrites. The electrolyte may also be purified by preelectrodising at a controlled voltage of 2.10 until the current falls to a steady value. This reduces the self discharge of the cell, raising the hydrogen over-potential and giving less zinc oxidation on standing and it also results in a higher pH being tolerated.

It has been found that a clear optimum for a high performance in the electrolyte is with a pH value of 2.5 to 4.0 and a specific gravity of 1.1 to 1.25, and the use of the lower density also minimises foaming during charging and the onset of dendrite formation. In these circumstances when the dendrites do form they are a different form and resist shorting out of the cell over long periods.

Potassium chloride to saturation may be added into the electrolyte to improve the conductivity and current efficiency, and at the same time the zinc deposit becomes more mossy which can be improved by adding a salt of a weak acid such as acetate to stabilise the pH near the zinc.

The addition of an acid producing depolariser such as HClO is beneficial to stop dendrites and is formed by dissolving chlorine; when this depolariser is employed it may be desirable to include a small device such as a pump in the battery to circulate the electrolyte in the cells. A velocity of one half to two feet per second is a suitable circulating condition and may be effected by using a pump or employing the evolution of the chlorine bubbles so that the solution is self pumping. The chlorine tends to dissolve off any dendrites which, as they grow, approach the carbon surface of the electrodes 12 too closely. The chlorine can be fed to the cell dissolved in the electrolyte which is then passed over solid carbon electrodes as distinct from the hollow electrodes employed, the chlorine-deficient electrolyte being passed over the zinc electrodes before resaturation with chlorine.

Referring to FIG. 9 the chlorine is maintained in liquid form under high pressure in the cylinder 30 and to charge the battery already filled with electrolyte, the valve 31 is opened to allow the chlorine to flow to the inlet 28 in the lid of the battery casing; the chlorine then flows down through the end electrode 12 to the gas channel 24 whence it flows to the underside of all the electrodes 12 and displaces any electrolyte in the space between the two electrode structures of the carbon-metal electrodes 12. Any excess chlorine at this stage which may be given off leaves the battery by the outlet 23 and flows through the pipe 32 past the ultra-violet lamp 33 which operates in a normal manner to remove hydrogen and other impurities from the chlorine. The chlorine then passes to the liquefier 34 and thence back via pipe 36 to the cylinder 30 at a pressure, with the valve 31 shut, which will enable the chlorine to enter the cylinder against the pressure therein. The removal of the hydrogen is effected by converting it into hydrochloric acid which as already described is then returned by the line 35 to the battery at a suitable entry point in the centre of the lid whence it dilutes the electrolyte.

The initial charge of the battery may alternatively be carried out electrically or by blowing chlorine gas through the gas circuit of the cells. When discharged the battery is recharged by passing an electric e.g. mains current suitably transformed and rectified through the battery by connection to the terminals 15, 16.

Should the dendrites grow to the point where they short across the cell or battery this can be rejuvenated by tipping out the electrolyte and filling with hydrochloric acid to dissolve the zinc and then washing out and recharging with the zinc chloride electrolyte. This is an infrequent requirement.

While the carbon titanium electrodes have been described in the form shown in FIGS. 1 to 3 it will be understood that they may be of any plate like character such as circular or oval. Similarly the zinc titanium electrodes may be circular or oval.

A battery of the aforesaid description is suitable for example for use in electrically driven vehicles. The battery also has other uses such as in brine electrolysis, sewerage treatment and other synthetic uses.

We claim:

1. A rechargeable zinc-halogen electric cell comprising:
   (a) a casing;
   (b) storage means external to said casing for storing molecular halogen;
   (c) at least one halogen electrode structure located within said casing comprising an apertured substrate consisting essentially of an anodizable metal selected from the group consisting of Groups IV(A) and V(A) of the Periodic Table according to Mendeleef and having an inherent oxide layer thereon, said substrate having permanently associated therewith at least one coherent permeable stratum of a mixture of substantially porous carbon and a polymeric binder, said electrode structure having been produced by pressing said mixture of porous carbon and binder at a pressure of at least 2 tons psi onto said substrate to provide a flexible halogen electrode structure, said halogen electrode structure being adapted to provide a space therein in communication with said external storage means for molecular halogen into and through which space molecular halogen can move;
   (d) at least one metal bearing anode structure located within said casing including a zinc-containing material supported on an electrically conducting substrate; and
   (e) positive and negative electric conductors leading from said electrode structures to terminals accessible to the outside of said casing; said casing being adapted to hold a body of liquid and flowable zinc halide electrolyte in contact with each of said electrode structures.

2. The cell of claim 1 wherein said binder is a thermoplastic resin.

3. The cell of claim 2 wherein said resin is a member selected from the group consisting of polyethylene, polyvinyl chloride, polytetrafluoroethylene, polychloroprene, polypropylene, nylon or nitrile rubber.

4. The cell of claim 3 wherein said resin is polychloroprene.

5. The cell of claim 3 wherein said resin is nitrile rubber.

6. The cell of claim 1 wherein said mixture of porous carbon and binder is pressed onto said substrate at a pressure of between 2 and 5 tons psi.

7. The cell of claim 6 wherein said mixture of porous carbon and binder is pressed onto said substrate at a temperature of between 15 and 140° C.

8. The cell of claim 1 in which said halogen is at least one member selected from the group consisting of chlorine, bromine, and iodine.

9. The cell of claim 1 in which said anodizable metal is at least one metal or alloy selected from the group consisting of titanium, tantalum, and zirconium.

10. The cell of claim 1 in which said anodizable metal is titanium.

11. The cell of claim 1 in which said metal supporting substrate is in the form of an open mesh.

12. The cell of claim 1 in which said metal supporting substrate is in the form of an apertured sheet.

13. The cell of claim 1 in which said metal supporting substrate is in the form of a porous sheet of the metal having a pore size between about 3 and about 26 thousandths of an inch in diameter.

14. The cell of claim 1 in which said anodizable metal is an alloy of titanium containing about 0.5% tantalum by weight.

15. The cell of claim 1 in which said anodizable metal is coated with a film selected from the group consisting of a semiconducting material, a nitride, a mixed oxide, a boride, and an element yielding a higher valency oxide.

16. The cell of claim 4 in which said porous carbon is in particulate form and bonded with polychloroprene having a particle size in the range of about 50 to 190 m$\mu$.

17. The cell of claim 2 in which said porous carbon is acetylene black and said resin constitutes about 5 to 25% by weight of the bonded mixture.

18. The cell of claim 1 in which said zinc-containing material is zinc metal.

19. The cell of claim 1 in which said zinc-containing material is a zinc alloy.

20. The cell of claim 1 in which said zinc-containing material is applied to the metal substrate as a coating of molten zinc.

21. The cell of claim 1 further including spacer elements of inert material located within said casing and separating adjacent electrodes, said spacer elements being of a resin selected from the group consisting of polyethylene and polytetrafluoroethylene.

22. The cell of claim 1 in which said casing has titanium end walls, titanium walls separating electrode compartments in said casing, a plurality of halogen storing electrodes mounted between two consecutive titanium walls interspaced with zinc metal bearing electrodes, said halogen gas supplying means communicating with a gas duct beneath each set of electrodes.

23. The cell of claim 1 in which said halogen is chlorine, and said electrolyte is zinc chloride.

24. The cell of claim 1 in which said electrolyte has a pH value between about 2.5 and about 4.0, and a specific gravity between about 1.0 and about 1.25.

25. The cell of claim 1 in which said electrolyte has been purified by dissolving the solute in deionized water containing zinc dust to precipitate impurities.

26. The cell of claim 1 in which said electrolyte contains a small quantity of a metal selected from the group consisting of mercury, indium, and gallium, to minimize the formation of dendrites.

27. The cell of claim 1 in which said electrolyte contains a material selected from the group consisting of a polyelectrolyte, thiourea, and potassium chloride, or mixtures thereof.

28. The cell of claim 1 in which said storage means comprises a halogen gas circuit including a halogen gas cylinder, a pressure regulator valve, a source of ultraviolet light to remove hydrogen and other undesirable contaminants from the circuit, and a halogen gas liquifier.

* * * * *